United States Patent [19]

Kasai et al.

[11] 4,095,481

[45] Jun. 20, 1978

[54] JOINT MECHANISM OF MANIPULATOR

[75] Inventors: Masuo Kasai; Kanji Kato, both of Kokubunji; Yasuhide Matsumura, Hachioji; Kiyoo Takeyasu, Tokorozawa; Raiji Shimomura, Kokubunji, all of Japan

[73] Assignee: Hitachi, Ltd., Japan

[21] Appl. No.: 746,628

[22] Filed: Dec. 1, 1976

[30] Foreign Application Priority Data

Dec. 19, 1975 Japan .................. 50-150576

[51] Int. Cl.² ........................... B25J 3/02
[52] U.S. Cl. ........................ 74/469; 3/12.5; 214/1 CM
[58] Field of Search ............ 74/469, 471 XY; 3/1.1, 3/12.5; 214/1 CM

[56] References Cited

U.S. PATENT DOCUMENTS

| 3,731,820 | 5/1973 | Niki et al. | 74/469 X |
| 3,888,362 | 6/1975 | Fletcher et al. | 214/1 CM X |
| 3,951,271 | 4/1976 | Mette | 214/1 CM |
| 3,995,746 | 12/1976 | Usagida | 214/1 CM |
| 4,023,636 | 5/1977 | Levin | 74/471 XY X |

Primary Examiner—Allan D. Herrann
Attorney, Agent, or Firm—Craig & Antonelli

[57] ABSTRACT

A joint mechanism of a manipulator, according to the present invention, consists of a first joint having its rotating shaft aligned with the Z-axis in the X-Y-Z Cartesian coordinate system established at a desired position in a working space, a second joint connected to the rotating shaft of the first joint and having its rotating shaft positioned within the X-Y coordinate plane, a third joint, connected to the rotating shaft of the second joint and having its rotating shaft aligned with the vector passing through the origin of the Cartesian coordinate system, and an arm assembly connected to the rotating shaft of the third joint and comprising a link mechanism which is driven so that a wrist connected to said arm assembly may be always moved on the prolongation line of the vector, to thereby provide a simplified joint mechanism of a manipulator having a redundant degree of freedom of the posture completely independent to the position of the wrist.

14 Claims, 8 Drawing Figures

JOINT MECHANISM OF MANIPULATOR

BACKGROUND OF THE INVENTION

This invention relates to a joint mechanism of a manipulator controlled by a spherical coordinate system and having an independent redundant degree of freedom, as used in a carrier device, etc.

Generally, it will be understood that a human hand connected to a wrist can be positioned by determining the length of the vector from shoulder to the wrist and the direction of that vector. Thus, a spherical coordinate system is conventionally used as the optimum coordinate system in describing such movements. In addition, the position of the elbow is related to the redundant degree of freedom which determines the posture of the arm, whereby man can control the posture of the arm to adapt to the working conditions and avoid an obstacle while working.

Conventionally, the prior art joint mechanism of a manipulator which performs such an actuating function has a construction such as shown in FIG. 1. This joint mechanism controls the right and leftward movement of the wrist W by operating a joint $\alpha$, it controls the up and downward movement of the wrist W by operating a joint $\theta$, and the length from the origin S to the wrist W is controlled by operating a joint $\phi$, to thereby position the wrist W. The posture of the arm is taken by changing the position of the elbow E by means of a joint $\beta$ located at the origin S of the coordinate system. The rotating shaft of the joint $\alpha$ is aligned with the Z-axis, and the X-axis and Y-axis are so provided that the X-Y coordinate plant includes the rotating shaft of the joint $\beta$. Further, S' denotes an intersecting point of the rotating shafts of the joints $\beta$ and $\theta$.

In the prior art where the vector $\vec{SW}$, which determines the position of the wrist W, is expressed by a spherical coordinate system, the elements $l$, $\theta'$ amd $\alpha'$ of the spherical coordinate system are not independent variables. As shown in FIG. 2, the length $l$ of the vector $\vec{SW}$ is a function of the variables $\phi$ and $\theta$, its direction $\theta'$ being a function of the variables $\theta$, $\phi$ and $\beta$, and the other direction $\alpha'$ being a function of the variables $\alpha$, $\theta$, $\phi$ and $\beta$. Therefore, the above elements of the coordinate system and the joints are not in relation of one-to-one so that when the joint $\theta$, for example, is operated, all of the elements $l$, $\theta'$ and $\alpha'$ may be varied. That is to say, this means that even if only one of the variables $l$, $\theta'$ and $\alpha'$ of the spherical coordinate system is desired to be varied, a complicated control is required. Further, when driving the joint $\beta$, which provides the redundant degree of freedom, the posture of the arm is varied, and the position of the wrist also may be changed at the same time.

SUMMARY OF THE INVENTION

An object of the present invention is, in a manipulator which is positioned within a spherical coordinate system, to provide a joint mechanism of a manipulator in which the complicated control, as stated above, has been eliminated, and which has a redundant degree of freedom of the posture thereof completely independent of the position of the wrist.

That is, according to the present invention, the joint mechanism of the manipulator consists of a first joint providing a rotating shaft aligned with the Z-axis of the coordinate system established at a desired position in a working space, a second joint, connected to the rotating shaft of the first joint and having its rotating shaft positioned within the X-Y coordinate plane, a third joint connected to the rotating shaft of the second joint and having its rotating shaft aligned with a vector passing through the origin of the above-mentioned coordinate system, and an arm assembly, connected to the rotating shaft of the third joint. The arm assembly may be formed of a link mechanism which is driven so that a wrist connected to the assembly may be always moved on the line of the vector aligned with the rotating shaft of the third joint, whereby a simplified joint mechanism of a manipulator which has a redundant degree of freedom of the posture thereof completely independent of the position of the wrist, can be provided.

These and other objects, features, and advantages of the present invention will become more apparent from the following detailed description of exemplary embodiments of the invention when taken in conjunction with the accompanying drawings.

DETAILED DESCRIPTION OF THE PREFERRED EMBODIMENTS

The present invention will be hereinafter explained in detail with reference to various embodiments thereof.

Figure 1:
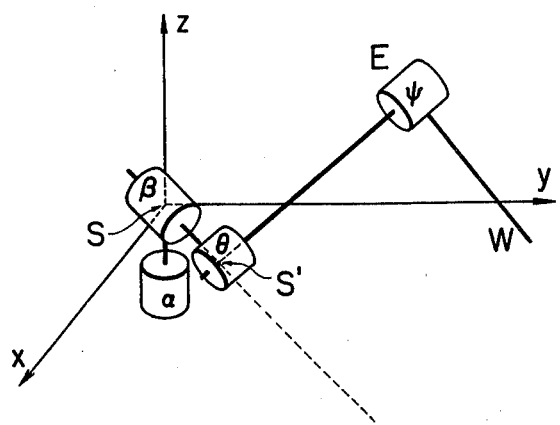
FIG. 1 and 2 are schematic diagrams for explaining the construction and operation of a conventional joint mechanism of a manipulator.
Figure 2:
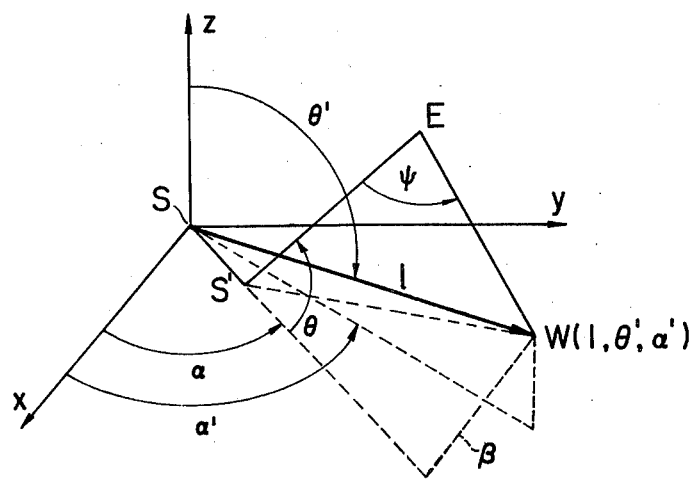
Figure 3:
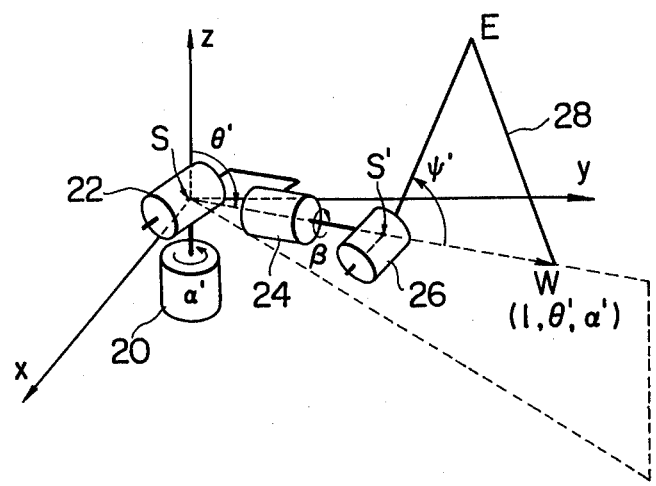
FIGS. 3 and 4 are schematic diagrams for explaining the construction and operation of a joint mechanism of a manipulator according to the present invention.

A joint mechanism of a manipulator, according to the present invention, as shown in FIG. 3, consists of a first joint 20 which has a rotating shaft aligned with the Z-axis of the Cartesian coordinate system, a second joint 22 connected to the rotating shaft of the first joint 20 and having its rotating shaft positioned within the X-Y coordinate plane, a third joint 24 mounted to the rotating shaft of the second joint 22 and having its rotating shaft aligned with the vector $\vec{SS'}$ from the origin S, and an arm assembly 28 mounted to the rotating shaft of the third joint 24 by way of a driving mechanism 26 so that the wrist W may be always moved on the extended line of the vector $\vec{SS'}$. The details of the driving mechanism 26 and the arm assembly 28 of the link mechanism will be later explained in more detail.

Figure 4:
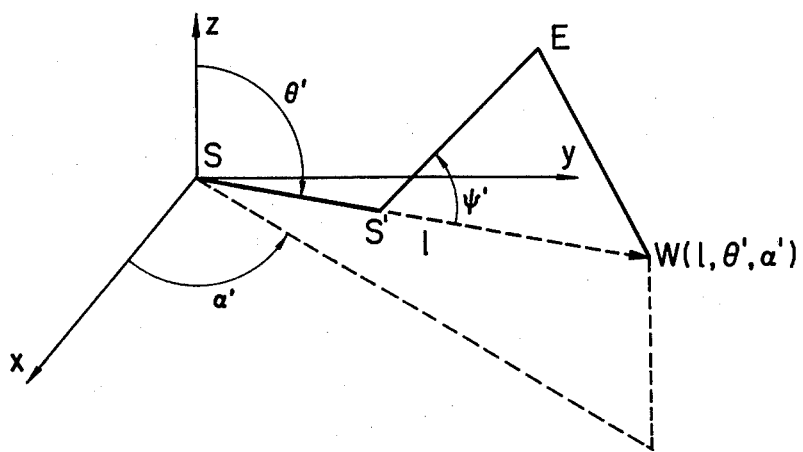

In this joint mechanism of a manipulator, as shown in FIG. 4, the position of the wrist W can be uniquely determined by the spherical coordinates ($l$, $\theta'$, $\alpha'$), wherein $l$ denotes the distance from the shoulder S to the wrist W, that is ($\overline{SS'} + \overline{S'W}$), but is a function of only the driving angle $\phi'$ of the driving mechanism 26 since the length of the vector $\vec{SS'}$ is always constant, $\theta'$ denoting a rotating angle of the second joint 22 and $\alpha'$ denoting a rotating angle of the first joint 20. Thus, to adjust one of the elements $l$, $\theta'$ and $\alpha'$ independently can be easily accomplished by driving only one joint or the driving mechanism, so that its control may be markedly simplified. Furthermore, even if the third joint 24 which determines the posture of the arm assembly 28 is operated, the position of the wrist W is not changed since the points S, S' and W are always located on one and the same straight line.

Figure 5:
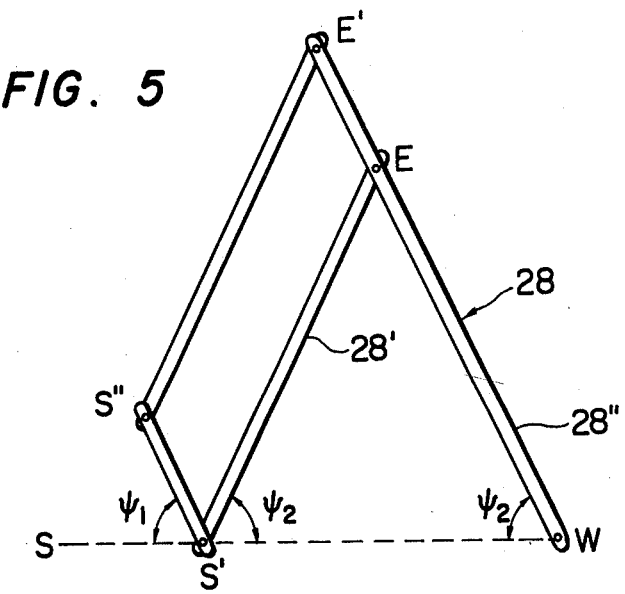
FIGS. 5 and 7 are segmental plan views for explaining the embodiments of the present invention, respectively
Figure 6:
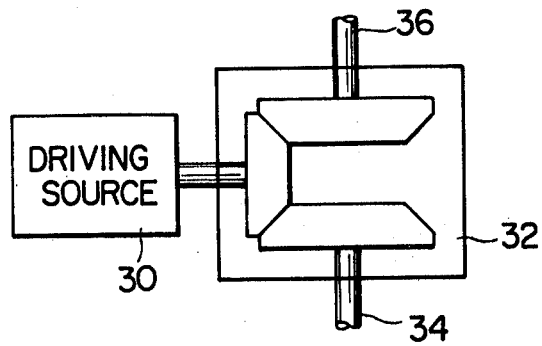

FIGS. 5 and 6 show concrete examples of the arm assembly 28 of the link mechanism and the driving mechanism 26 as used in the present invention, respectively. In FIG. 5, the arm assembly 28 comprises a first arm 28' extending along the line S'E and a second arm 28" extending along the line EW, the first arm 28' and the second arm 28" being connected at the point E in a plane including the vector $\vec{SS'}$ or its prolongation line S'W.

Further, the second arm 28" is extended to the point E' in the direction of W to E (W→E), and thus the link mechanism is composed of a S'-E-E'-S"-S' parallelogram, which has, as its two adjacent sides, the first arm 28' and an extended part EE' of the second arm 28".

In this case, as well as the point E, each adjacent side of the parallelogram is mutually connected in the plane including the vector $\vec{SS'}$ or its prolongation line S'W. Furthermore, the first arm 28' and the second arm 28" are connected so the S'E is equal to EW, with the result that the angle $\phi_1$ of a side S'S" of the link assembly to the vector $\vec{SS'}$ is always equal to the angle $\phi_2$ of S'E to $\vec{SS'}$, and the angle of the second arm 28", WE, to the vector $\vec{SS'}$ also will be equal to the angle $\phi_2$.

Figure 8:
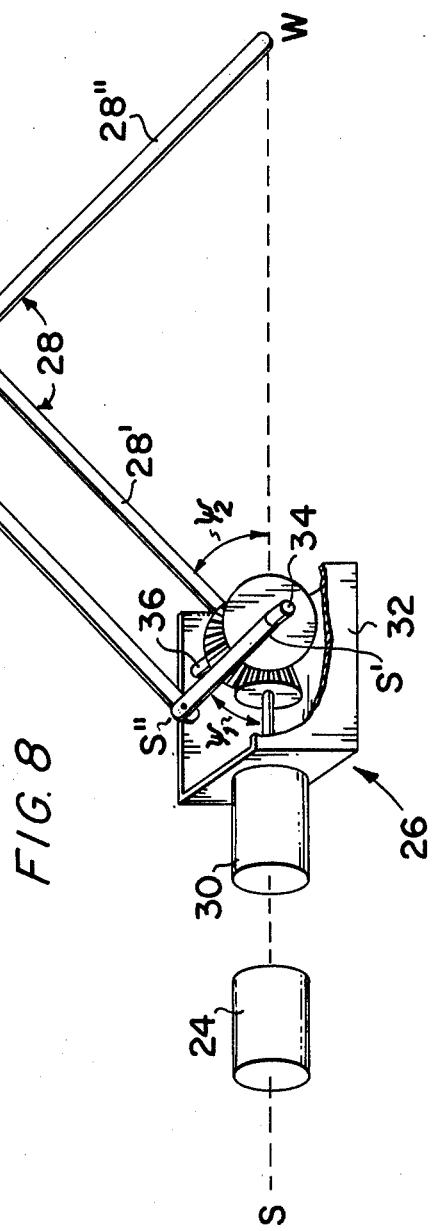
FIG. 8 is an isometric view of the combined segmental structures of the present invention as shown in FIGS. 5 and 6.

In this case it is possible to always locate the position of the wrist W on the extended line of the vector SS' in the arm assembly 28, merely by always maintaining the relation wherein the angle $\phi_1$ is equal to the angle $\phi_2$. This can be accomplished by driving S'S" and S'E by different driving shafts. For this purpose, as shown in FIG. 8 in the present embodiment, a differential gear 32 is driven by a driving source 30, a third arm (side S'S") and the first arm 28'(side S'E) being driven by respective output shafts 34 and 36 of the differential gear 32.

Figure 7:
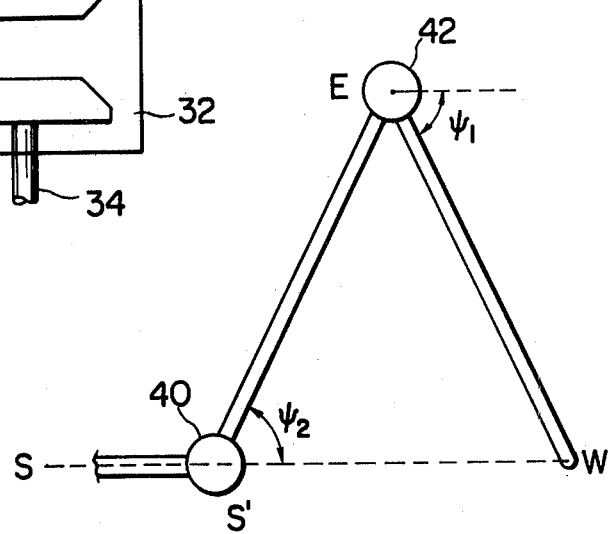

FIG. 7 shows another embodiment of this invention which does not make use of a link mechanism as described above in connection with FIG. 5. In FIG. 7, driving motors 40 and 42 are provided at the respective positions S' and E and are controlled so as to always maintain the angel $\phi_1$ equal to the angle $\phi_2$. In this way it is also possible to move the wrist W on the extended line of the vector $\vec{SS'}$ at all times.

As stated above, where the position of the wrist is determined by using a spherical coordinate system, the coordinate values l, $\theta'$ and $\alpha'$ in the conventional joint mechanism of the manipulator have been expressed as functions of a plurality of the joints, respectively, as shown in the following formulae:

$$l = f(\theta, \phi)$$

$$\theta' = f(\theta, \phi, \beta)$$

$$\alpha' = f(\theta, \phi, \beta, \alpha)$$

Thus, in the conventional apparatus, it is difficult to position the wrist since, when one joint is driven in order to determine the length l, the directions $\theta'$ and $\alpha'$ will be varied at the same time.

On the other hand, in accordance with the present invention, it is very simple to position the wrist since the parameters l, $\theta'$ and $\alpha'$ can be determined by only one variable, respectively, as seen in the following formulae:

$$l = f(\phi)$$

$$\theta' = f(\theta)$$

$$\alpha' = f(\alpha)$$

Consequently, in accordance with the present invention, the control for the positioning of the wrist can be very greatly simplified, and further it is possible to easily change the posture of the wrist and avoid an obstacle while working since the position of the elbow which denotes the redundant degree of freedom, can be changed independent of the position of the wrist.

While we have shown and described an embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. A joint mechanism of a manipulator comprising
    a first joint having a rotating shaft in alignment with the Z-axis of an X-Y-Z Cartesian coordinate system,
    a second joint connected to the rotating shaft of said first joint and having a rotating shaft positioned within the X-Y coordinate plane,
    a third joint connected to the rotating shaft of said second joint and having a rotating shaft extending along a vector passing through the origin of the Cartesian coordinate system,
    and an arm assembly connected to the rotating shaft of said third joint comprising linkage means which is driven so that a wrist connected to said arm assembly may be always moved on the line of said vector.

2. A joint mechanism of a manipulator as claimed in claim 1, wherein said linkage means includes a first arm which is driven by a driving mechanism connected to the rotating shaft of said third joint, and a second arm connected to said first arm in a plane including said vector, said first and second arms being driven so that the angle of said first arm to said vector may be always equal to the angle of said second arm to said vector.

3. A joint mechanism of a manipulator as claimed in claim 2 wherein said first and second arms are of equal length.

4. A joint mechanism of a manipulator as claimed in claim 1, wherein said linkage means comprises a first arm which is driven by a driving mechanism connected to the rotating shaft of said third joint and a second arm connected to said first arm in a plane including said vector, said first and second arms forming parts of a link assembly in the shape of a parallelogram which has two of its adjacent sides formed by said first arm and an extended part of said second arm, respectively, each adjacent side of said parallelogram being mutually connected in a plane including said vector.

5. A joint mechanism of a manipulator as claimed in claim 4, wherein the length of said first arm is equal to that of said second arm except for said extended part thereof included in said parallelogram link assembly.

6. A joint mechanism of a manipulator as claimed in claim 4, wherein said driving mechanism connected to said third joint includes a differential gear having two output shafts which are, respectively, connected to said first arm and another adjacent side with a differential length from said first arm in said parallelogram link assembly, said output shafts being driven so that the angle of said first arm to said vector may be always equal to the angle of said other adjacent side to said vector.

7. A joint mechanism of a manipulator as claimed in claim 2, wherein said driving mechanism includes a motor for driving said first arm, and said linkage means further includes another motor for driving said second arm, at the connecting part of said first arm and said second arm, said motor and said other motor being controlled so that the angle of said first arm to said vector may be always equal to the angle of said second arm to said vector.

8. A joint mechanism of a manipulator comprising
a first joint having a rotating shaft in alignment with the Z-axis of an X-Y-Z Cartesian coordinate system,
a second joint connected to the rotating shaft of said first joint to be rotated thereby and having a rotating shaft positioned within the X-Y coordinate plane,
a third joint connected to the rotating shaft of said second joint to be rotated thereby and having a rotating shaft extending along a vector passing through the origin of the Cartesian coordinate system,
a driving mechanism connected to the rotating shaft of said third joint to be rotated thereby and having a rotating shaft extending transverse to said vector, and
an arm assembly connected to the rotating shaft of said driving mechanism and extending in a plane including said vector, including linkage means having one end connected to said rotating shaft of said driving mechanism and another end to be moved solely along the line of said vector.

9. A joint mechanism as claimed in claim 8, wherein said linkage means includes a first arm connected at one end to the rotating shaft of said driving mechanism, and a second arm connected to the other end of said first arm, and driving motor means for maintaining the angle of said first arm to said vector always equal to the angle of said second arm to said vector.

10. A joint mechanism as claimed in claim 9, wherein said driving motor means includes a motor for driving said first arm and another motor for driving said second arm at the point of connection of said first and second arms.

11. A joint mechanism as claimed in claim 10, wherein said first and second arms are of equal length.

12. A joint mechanism as claimed in claim 8, wherein said linkage means includes a link assembly formed by a plurality of arms interconnected in the shape of a parallelogram one of said arms having one end connected to the rotating shaft of said driving mechanism and a second arm adjacent said one arm having an extended portion whose end is located on the line of said vector.

13. A joint mechanism as claimed in claim 12, wherein said driving mechanism includes a differential gear having respective output shafts connected to said one arm and a third arm adjacent said one arm in the parallelogram configuration.

14. A joint mechanism as claimed in claim 13 wherein said third arm and the extended part of said second arm are equal in length.

* * * * *